(12) United States Patent
Verde

(10) Patent No.: US 11,447,617 B2
(45) Date of Patent: Sep. 20, 2022

(54) RECYCLING OF POLYMER MATERIALS

(71) Applicant: Logoplaste Innovation LAB LDA, Cascais (PT)

(72) Inventor: Vitor Vila Verde, Cascais (PT)

(73) Assignee: LOGOPLASTE INNOVATION LAB LDA, Cascais (PT)

( * ) Notice: Subject to any disclaimer, the term of this patent is extended or adjusted under 35 U.S.C. 154(b) by 0 days.

(21) Appl. No.: 17/092,410

(22) Filed: Nov. 9, 2020

(65) Prior Publication Data
US 2021/0340349 A1    Nov. 4, 2021

(30) Foreign Application Priority Data

May 1, 2020    (EP) .................................... 20172612

(51) Int. Cl.
| | |
|---|---|
| *C08J 11/06* | (2006.01) |
| *B29B 9/08* | (2006.01) |
| *B29B 9/12* | (2006.01) |
| *B29B 11/14* | (2006.01) |
| *B32B 27/08* | (2006.01) |
| *B32B 27/36* | (2006.01) |
| *B29K 67/00* | (2006.01) |

(52) U.S. Cl.
CPC .................. *C08J 11/06* (2013.01); *B29B 9/08* (2013.01); *B29B 9/12* (2013.01); *B29B 11/14* (2013.01); *B32B 27/08* (2013.01); *B32B 27/36* (2013.01); *B29K 2067/003* (2013.01); *B32B 2250/03* (2013.01); *B32B 2264/0285* (2013.01); *C08J 2367/02* (2013.01)

(58) Field of Classification Search
CPC ....... C08J 11/06; C08J 2367/02; B29B 11/14; B29B 9/08; B29B 9/12; B32B 27/08; B32B 27/36; B32B 2250/03; B32B 2264/0285; B29K 2067/003
See application file for complete search history.

(56) References Cited

U.S. PATENT DOCUMENTS

| | | |
|---|---|---|
| 2012/0199675 A1 | 8/2012 | Kulesa et al. |
| 2013/0099160 A1 | 4/2013 | Topolkaraev et al. |
| 2014/0220280 A1* | 8/2014 | Sethu .................... B29C 48/395 428/36.9 |
| 2019/0002662 A1* | 1/2019 | Baldwin ................ B29C 44/24 |

FOREIGN PATENT DOCUMENTS

| | | |
|---|---|---|
| DE | 44 13 801 A1 | 2/1995 |
| EP | 3 421 213 A1 | 1/2019 |
| RU | 2 418 676 C1 | 5/2011 |
| WO | WO 2006/079842 | 8/2006 |
| WO | WO 2013/057737 | 4/2013 |

OTHER PUBLICATIONS

Extended European Search Report issued in European Application No. 20171612.2, dated Jun. 19, 2020.
First Office Action issued in European Application No. 20171612.2, dated Mar. 10, 2021.
Response to First Office Action issued in European Application No. 20171612.2, dated Mar. 23, 2021.
Brief Communication issued in European Application No. 20171612.2, dated Apr. 19, 2021.

* cited by examiner

*Primary Examiner* — Frances Tischler
(74) *Attorney, Agent, or Firm* — ParkerHighlander PLLC

(57) ABSTRACT

A process for recycling thermoplastic polymer material to produce polymer pre-form, the process comprising the steps of pre-treating a polymer material for example by separating, sorting, cleaning and/or shaping; shredding the pre-treated polymer to produce polymer flakes; and processing the polymer material to produce a pre-form, characterised in that prior to the step (iii) of producing the pre-form, the polymer flakes are compacted to form pellets.

6 Claims, No Drawings

RECYCLING OF POLYMER MATERIALS

This application claims benefit of priority to European Application No. 20172612.2, filed May 1, 2020, the entire contents of which are hereby incorporated by reference.

The present invention relates to a process of recycling thermoplastic polymers such as high-density polyethylene (HDPE), low density polyethylene (LDPE), polypropylene (PP) polyethylene terephthalate (PET), and other polymers. In a preferred embodiment, the recycled thermoplastic polymer is PET.

Recycling of waste and used products has become increasingly common practice in recent decades, with the recycling of plastics materials being one of the most important and widely carried out forms of recycling. A multitude of everyday consumer items are made from polymer materials, such as textiles, bottles, bags and product packaging.

A problem with current polymer recycling processes lies in the energy requirement the process requires. Ideally plastics articles are manufactured with minimal energy use. In post-consumer recycling (PCR) applications, recycled polymer can be utilised with or without virgin polymer to manufacture a new polymer article.

Processes exist for incorporating recycled polymers into new polymer articles. In an example of such a process involving the manufacture of a PET pre-form, which can be processed by known techniques, the source of recycled PET can be crushed bottle bales, of the type typically prepared during early recycling stages. Such a bale will then typically undergo sorting to separate different materials within it. The PET components can then be separated and subjected to a pre-wash; typically, in PET recycling, the polymer will be separated into different colour PETs, with batches of the same colour being processed separately to different colours.

The washed polymer, e.g. in the form of bottles, may then be subjected to a shredding process. Such a shredding process reduces the PET to flakes, which typically have a bulk density of around 300 kg/m$^3$. The flakes may then be re-washed, and then subjected to an extrusion and pelleting process, the resulting pellets thereafter being dried and crystalized. The resulting pellets typically have an average bulk density of around 800 kg/m$^3$. These pellets can then optionally be blended with virgin PET. Such a PET blend can then be subjected to an injection moulding process using conventional moulding machines and procedures to produce a PET preform, which can then be further processed for example to make a PET bottle, again using known blow moulding equipment and processes.

A problem with such known processes lies in the extrusion process typically utilised as part of the PCR process. In a typical extrusion process, an extruder will have a flake hopper at one end, and a die at the other end. In between, the extruder may have a horizontal elongate barrel housing a screw and heaters. The extruder may have a vent located near the mid-point of the barrel, where volatile materials may separate from solid or liquid materials passing along the barrel. Extruders typically operate at temperatures in the region of 160° C. to 270° C., conveniently 180° C. to 240° C., though the exact temperature will depend on the polymer material being extruded. Temperatures in the extruder are measured immediately upstream of the die. Once they have been extruded, the pellets are typically cooled in a water bath before undergoing subsequent processing.

Provided that the extruded pellets are of sufficiently quality, it is possible that recycled polymer articles, such as polymer bottles, can be made with 100% recycled material.

During the extrusion process, it is necessary that the polymer is heated to a temperature that causes the polymer to crystalize, at least to a degree. In contrast to a crystalline polymer, in which a significant proportion of the polymer chains are arranged in an ordered fashion, in an amorphous polymer the polymer chains are randomly arranged. Crystalline polymers may not be 100% ordered in their structure, but as a consequence of being at least partially crystalline they demonstrate relatively discreet melting points. Such melting points are also discreetly higher than a polymer's glass transition temperature. In contrast, because of the random polymer structure, amorphous polymers will demonstrate no clear melting point, but instead have a glass transition temperature, i.e. a temperature range in which the polymer transitions from being rigid or solid to being soft and pliable. The melting point of a crystalline polymer is typically significantly narrower than, and significantly higher than, the glass transition temperature of the corresponding polymer in amorphous form.

In recycling polymers, it is desirable that the polymer that is being recycled is at least partially crystalline. The reason for this is that it is undesirable in a polymer recycling process to be working with an amorphous polymer which has a relatively low and broad glass transition temperature. Such a polymer mass being processed which is made up of or containing such amorphous polymer tends to be sticky, which makes the drying process of the mass difficult. In contrast, when working with crystalline polymers, these tend to have higher and more discreet melting points, which in general tend to make their drying feasible, without the pellets sticking to each other. Additionally, the drying process is necessary to reduce the moisture to a level which will avoid hydrolytic chain scission and hence molecular weight reduction. Preferably, the moisture content of the polymer, whether virgin or recycled but particularly if recycled, should be below 0.05 wt %, preferably below 0.02 wt %, to avoid hydrolytic viscosity drop during any injection process.

According to a first aspect of the present invention, there is provided a process for recycling thermoplastic polymer material to produce polymer pre-form, the process comprising the steps of:
(i) pre-treating a polymer material for example by separating, sorting, cleaning, drying and/or shaping;
(ii) shredding the pre-treated polymer to produce polymer flakes;
(iii) processing the shredded polymer material to produce a pre-form, characterised in that prior to the step (iii) of producing the pre-form, the polymer flakes are compacted to form pellets.

Conveniently in the compaction step, the compacted pellets have an average bulk density of at least 400 kg/m$^3$.

The pre-form may be made for example by injection moulding, using known equipment and techniques. Conveniently, the compacted polymer pellets may be manufactured by known equipment and techniques. In a preferred embodiment, the step of compacting the polymer to form compacted pellets is carried out just prior, preferably immediately prior to the step of producing the pre-form.

Conveniently the compaction step comprises simply applying physical pressure to polymer flakes; no additional source of heat is applied, the only heat involved being that generated by the actual physical compaction, including by friction within the compaction apparatus. Conveniently the compaction step involves no extrusion.

In a further embodiment, the invention comprises a polymer pre-form made according to the process of the invention. In another embodiment, the invention comprises a polymer article made from such a polymer pre-form, for example a food or drink container such as a bottle, conveniently a blow-moulded bottle.

The process according to the invention has been found to be advantageous since it allows for the omission of an extrusion step in the recycling process. As the recycling step is very energy-consuming, use of the process according to the invention may provide for a recycling process which uses less energy. In place of extrusion, the applicant has found that the use of a compaction step applied to polymer flakes provides a polymer feedstock which is suitable for use in subsequent processing steps, such as forming a polymer pre-form. The compaction step uses less energy than an extrusion step, as it does not involve heating a polymer mass to temperatures of about 160° C. or higher.

Step (i) involves a pre-treatment of the polymer material. The pre-treatment may comprise the steps of separating, sorting, cleaning, shaping, drying, or a combination of any two or more of such steps in any order. A convenient order of such pre-treatments steps is as stated, i.e. separating, sorting, cleaning and shaping. The pre-treatment step is intended to reduce the presence of external substances in or on the polymer material.

Advantageously, step (i) removes a high proportion of external substances, such as food or label contamination. Conveniently, the polymer material produced after the pre-treatments step is at least 98.0 wt %, preferably at least 99.0 wt %, preferably at least 99.5 wt % and preferably at least 99.9 wt % pure polymer.

Cleaning the polymer material typically comprises cleaning a surface of the polymer to remove external substances. Cleaning ideally should remove substantially all of the surface contaminants, any adsorbed substances and most of any surface printing, adhesives, or labels other external substances associated with the post-consumer polymer material.

The cleaning step may comprise cleaning the surface of the polymer material by washing with fluids, and/or abrasion with solids. The washing and/or abrasion process can be performed with or without surfactants, using high or low temperatures. However, step (i) should be performed below the melting point of the polymer material.

Pre-treatment typically comprises the steps of separating and/or sorting the polymer material. The steps of separating and/or sorting the polymer material may be performed before or after the cleaning step, but should be before the compaction step or step (iii).

The separation and/or sorting steps may ensure that the recycled polymer material is essentially all of one type of polymer, including essentially of all of one colour of each polymer type, and free of other polymers and contamination. The polymer material may typically be of a single polymer type to provide optimal process conditions for the specific polymer. However, in some embodiments it is possible to process mixtures of polymers by the process of the present invention. In such embodiments, the polymer material comprises a mixture of one or more thermoplastic polymers. The polymers may be selected from HDPE, LDPE, PP, PET and the like. In a preferred embodiment, the polymer is PET and PET blends; in some embodiments, the polymer is solely PET.

The sorting step can be achieved by manual sorting, sorting by physical principles such as specific gravity from other materials. In the alternatively, automatic sorting techniques such as near infrared analysis may be used. These can be used for example either in granulated flake format as obtained for example from a grinding step, or large product format.

The grinding of the polymer material in step (ii) will be performed after the cleaning, separating and/or sorting steps in step (i), though if preferred or required one or more further washing and drying steps can be carried out after step (ii), and prior to the compaction step. Typically, the polymer material is in a granulated flake form after being sorted and reduced in size by grinding equipment. While other physical forms of the polymer may also be generated after step (ii), polymer flakes are preferred.

Optionally, cleaning step(s) may be carried out using hot water. Hot washing step(s) may be performed after the separating, sorting and grinding steps (if present). Whilst the hot washing step(s) is/are optional and not essential for the process of the invention, hot washing as part of a pre-treatment regime (especially in step (i)) can help to improve the process, as hot washing is relatively efficient at removing labels, glues and some of the inks regularly used on packaging, as well as the volatile components.

Any hot washing step may typically take the form of hot water washing typically at about 50° C. to about 120° C., preferably at about 50° C. to 80° C. The hot washing step may also be carried out with an alkaline solution, for example containing sodium hydroxide and/or potassium hydroxide at a concentration of about 0.5 to 2.5 wt %. The alkaline solution may further comprise a detergent with a concentration of about 0.1 to 0.3 wt %. A suitable detergent is typically a low forming nonionic surfactant, but others such as anionic surfactants, for example sodium lauryl sulphonate may be used. The washing time of a hot washing step may be from 5 to 30 minutes, conveniently from 5 to 10 minutes.

Following any hot washing step, the polymer material e.g. flakes, would then typically be dried to a moisture level of less than 1 wt %, more typically less than 0.2 wt %, and in a preferred embodiment to a level of less than 0.05 wt %, preferably less than 0.02 wt %. This can be achieved for example by a combination of drying in warm air, and drying mechanically in a centrifuge.

After the pre-treatment step (i), the polymer is subjected to a process to reduce the polymer material to polymer flakes. Such equipment and processes are known and conventional. The resultant polymer flakes typically have a bulk density in the region of 100-500 kg/m$^3$, conveniently 200-400 kg/m$^3$, conveniently around 300 kg/m$^3$.

After the polymer material is made into polymer flakes but before it is injection moulded to form a pre-form, the polymer flakes are compacted. The resultant compacted pellets conveniently have a bulk density higher than 300 kg/m$^3$, preferably more than 350 kg/m$^3$, more preferably more than 380 kg/m$^3$. Preferably, the compacted pellets have a density no higher than about 850 kg/m$^3$. In a certain preferred embodiment, the compacted pellets will have a bulk density in the region 400-600 kg/m$^3$, ideally around 500 kg/m$^3$.

In an embodiment, a disc agglomerator may be used to compact the polymer flakes into compacted pellets.

Preferably, the disc agglomerator is one which compresses the flakes with no additional thermal input, any heat imparted to the polymer flakes in the process originating from friction within the agglomerator. A benefit of this is that the polymer flakes suffer minimal thermal damage. Preferably, the polymer flakes are only subjected to kneading and rolling processes with the composition step. Ideally, the polymer flakes are subjected only to the heat arising through friction within the agglomerator, which may cause the polymer material to plastify, sinter and be compressed.

A suitable disc agglomerator is available from WIPA, Germany under the trade name PlastCompactor. In such an agglomerator, a feeding system transports shredded plastic to a buffer container. An agitator in the buffer container provides permanent filling of a feeding screw and prevents bridging. The feeding screw pre-compacts the plastic material to be recycled, and feeds it to a disk pair, consisting of a moving rotor disk and a non-rotating stator disk serving as a counter element. Kneading and rolling between the disks creates friction and plastifies, sinters and compresses the material. If desired, additives such as colour pigments or plasticizer can be added using dosing units into the feeding screw.

In such compaction procedures and apparatuses, the dwell time of the plastics material in the compactor is typically a matter of a few seconds. Although heat is generated the melting point of the plastics material is not reached, and the material is only being transformed into a pasty condition which leaves the disks of its own volition.

The output of the compaction apparatus is typically in the form of noodles, which may be cut to the desired size to form pellets. The diameter of the noodles is determined by a screen in the agglomorator. The heat generated in the noodles/pellets contributes to moisture evaporation from them, helping the moisture content of them reduce, ideally and typically to less than about 0.5 wt %, conveniently less than 0.1 wt %, preferably less than 0.02 wt %; this is beneficial in subsequent processing of the pellets. The pellets may typically be cooled by air-cooling.

In a preferred embodiment, the temperature of the plastics material being processed in the compaction step reaches at least 80° C. Provided this temperature is reached during the compaction processing, it has been found that the combination of temperature and compaction causes the polymer material to achieve a viscoelastic state, and develop a degree of crystallization. This crystallization provides the compacted polymer product with beneficial properties in respect of subsequent processing, since in subsequent processes involving heating the polymer is less likely to be sticky. Conveniently in the compaction step, e.g. in the agglomerator, the temperature of the plastics material may reach a temperature of 80° C. to 160° C., preferably 130° C. to 150° C.

A further advantage of using a compaction step prior to forming a pre-form is that after compaction it is not necessary to carry out a water-cooling step after compaction; such a water-cooling step is usual at the end of extrusion processes. The absence of the need for a drying step is advantageous, as in subsequent processing step such as forming a pre-form or other blow moulding techniques, it is desirable that the water content of the plastic material before being dried is relatively low, i.e. ideally below 0.05 wt %, preferably less than 0.02 wt %. This is because during the subsequent injection procedures, water can cause the polymer material to hydrolyse if it is not dried properly. Omitting a water-cooling step means not only is energy saved by not needing to dry the cooled polymer material, but there is also reduced risk that polymer used in subsequent injection steps contains disadvantageous levels of moisture, which could lead to undesirable hydrolysis of the polymer and polymer article.

In an embodiment of the invention, the noodles resulting from the compaction step are subsequently processed shortly after they emerge from the compaction apparatus. The subsequent rapid processing of noodles from the compaction step can not only be energy saving in subsequent steps, as less energy is required to warm the noodles to processing temperature for forming the pre-mould, but because the noodles have not had time to cool, they will not have picked up moisture by any prolonged storage. However, preferably, the noodles subsequently processed will have not cooled to a temperature not higher than 60° C., in order that they are not near their softening point which may generate stickiness.

In the recycling process including a compaction step, a mixture of virgin and polymer and recycled polymer can be used to make subsequently processed articles such as pre-moulds and blow-moulded articles. However in an embodiment, the process (and the subsequently formed article) can use at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, preferably at least 90 wt % of recycled compacted polymer. In a preferred embodiment, the process (and subsequently formed article) can be made out of 100 wt % recycled compacted polymer.

In step (iii) of the process, i.e. the production of a pre-form which may be subsequently processed to form e.g. blow-moulded articles, the pre-form can take a number of forms; it may be single layer, or it may be a laminate, having e.g. two, three, or four or more layers, in ways which are conventionally known in the art. The process of the invention can be used to produced single layer or laminated pre-forms. A preferred form of the invention results in a single layer pre-form which may be made of 100% of the compacted pellets.

In another aspect of the invention, the pre-form may be a laminated preform, in which the laminate comprises three or more layers, one of more of the central layers of the pre-form (i.e. the non-outward facing layers) being formed by recycled polymer made with compacted pellets. In such an embodiment, the outward-facing layers may be made for example from virgin or more highly purified thermoplastic polymer, e.g. virgin PET, or more highly purified PET. In such embodiments, the central layer or layers may conveniently be coloured or opaque. Such embodiments have been found to be advantageous since the central layer or layers can be expected to be relatively cheap, having been made with recycled polymer material. However, if such recycled material does suffer from contaminants by virtue of having been recycled, the effects of such contaminants such as causing bursts or microholes, are mitigated by the outward facing layers of the laminate. In such embodiments, it is possible to e.g. include a central layer or layers which typically comprise 10 to 50 wt % of the laminate conveniently 20 to 40 wt %.

The invention will now be described by way of example only.

In tests involving PET pre-forms made according to the invention, using a Plasticompactor disk agglomorator, ex. WIPA, and a Multilayer Hypet 120 preform injection moulding system with a 45 mm main screw and a vertical secondary second layer injection unit, monolayer PET pre-forms were satisfactorily prepared using 100% PCR obtained using compacted pellets, as per the invention. Additionally, it was found that preparing two layer pre-forms, satisfactory pre-form preparation was obtained using a pre-form that had one layer made 100 wt % of compacted pellets, this layer comprising 40 wt % of the two-layer pre-form.

The invention claimed is:

1. A process for recycling thermoplastic polymer material to produce polymer pre-form, the process comprising the steps of:
   (i) pre-treating a polymer material for example by separating, sorting, cleaning and/or shaping;
   (ii) shredding the pre-treated polymer to produce polymer flakes;
   (iii) processing the polymer material to produce a pre-form, wherein the thermoplastic polymer material comprises one or more thermoplastic polymers, selected from high density polyethylene, low density polyethylene, polypropylene and polyethylene terephthalate, characterised in that prior to the step (iii) of producing the pre-form, the polymer flakes are compacted to form pellets, wherein the compactions step is carried out using a disk agglomerator, wherein the temperature of the material being processed in the compaction step reaches 80° C. to 160° C., and in which the compacted pellets are at least partially crystallized, and wherein the process involves no extrusion.

2. The process according to claim 1, in which the compacted pellets have an average bulk density of at least 300 kg/m$^3$.

3. The process according to claim 1, in which the compaction of the pellets is carried out immediately prior to the step of producing the pre-form.

4. The process according to claim 1, in which compacted pellets have a water content of less than 0.05 wt %.

5. The process according to claim 1, in which the temperature of the compacted pellets has not fallen below 40° C. prior to being used to form the pre-form.

6. The process according to claim 1, in which the polymer is solely polyethylene terephthalate.

* * * * *